UNITED STATES PATENT OFFICE.

SAMUEL PEACOCK, OF CHICAGO, ILLINOIS, ASSIGNOR, BY MESNE ASSIGNMENTS, TO AGRICULTURAL RESEARCH CORPORATION, OF NEW YORK, N. Y., A CORPORATION OF NEW YORK.

PROCESS OF PRODUCING PHOSPHORUS PENTACHLORID.

1,147,183. Specification of Letters Patent. Patented July 20, 1915.

No Drawing. Application filed July 17, 1912, Serial No. 710,100. Renewed March 5, 1913. Serial No. 752,250.

*To all whom it may concern:*

Be it known that I, SAMUEL PEACOCK, a citizen of the United States, residing at Chicago, in the county of Cook and State of Illinois, have invented certain new and useful Improvements in Processes of Producing Phosphorus Pentachlorid; and I do hereby declare the following to be a full, clear, and exact description of the invention, such as will enable others skilled in the art to which it appertains to make and use the same.

This invention relates to a process of producing phosphorus pentachlorid, and has for its object to provide a method of manufacturing this compound more expeditiously and less expensively than heretofore.

To these ends the invention consists in the combinations of steps constituting my invention more fully hereinafter disclosed and particularly pointed out in the claims.

In carrying out my process, I make a mixture of finely divided tri-calcium phosphate and sodium, or potassium chlorid in proportions to satisfy the equation below, and heat the same in an atmosphere devoid of uncombined oxygen. That is to say, for each equivalent of tri-calcium phosphate there is provided ten equivalents of an alkali metal chlorid, and if I heat the same in a closed vessel devoid of air at normal pressure, the reaction will proceed in accordance with the following equation:—

$$Ca_3P_2O_8 + 10KCl = 3CaO + 5K_2O + 2PCl_5$$

The reaction at atmospheric pressure begins at 850° C., but its velocity is slight, so that it is best to increase the temperature. At higher temperatures, however, more or less of the phosphorus pentachlorid $PCl_5$ will be dissociated into the trichlorid $PCl_3$ and $Cl_2$. Further, after the reaction proceeds for some time in a closed vessel even after the temperature is raised, the reaction velocity gradually diminishes until it stops with only about 20% to 30% of the alkali metal chlorid and phosphate decomposed. In order to avoid these most serious objections, I provide the closed chamber with a suitable suction apparatus, by which I remove the gaseous products of the reaction and thereby considerably decrease their partial pressures. Under these conditions, I find at a temperature of say 1100° C., the reaction proceeds with great velocity, and from 97% to 98% of the materials are decomposed, which makes the process commercially practicable.

The phosphorus chlorid may be collected as such, if desired, but I prefer to pass it through hot water when the following reaction occurs:—

$$2PCl_5 + 8H_2O = 2H_3PO_4 + 10HCl$$

The solution containing the hydrochloric and phosphoric acids may be concentrated and all the former acid may be displaced by volatilization and then condensed, thus effecting a separation of the two acids.

The residuum left in the furnace consists of lime and alkali metal oxid, which latter may be extracted with water by concentration and converted into commercial caustic potash, such as KOH. By this means the potash which was in its cheapest form as a potassium chlorid is changed into a hydrate which is a more expensive form.

What I claim is:—

1. The process of producing phosphorus pentachlorid from a phosphate and an alkali chlorid, which consists in heating said phosphate and alkali chlorid in a closed chamber at a pressure below that of the atmosphere and to a temperature sufficient to produce said pentachlorid, and simultaneously drawing off the products of the reaction, substantially as described.

2. The process of producing phosphorus pentachlorid from tri-calcium phosphate and an alkali chlorid which consists in heating said phosphate and alkali chlorid in a chamber devoid of free oxygen at a pressure below that of the atmosphere and to a temperature sufficient to produce said pentachlorid, and simultaneously drawing off the products of the reaction, substantially as described.

In testimony whereof, I affix my signature, in presence of two witnesses.

SAMUEL PEACOCK.

Witnesses:
T. A. WITHERSPOON,
N. CURTIS LAMMOND.